United States Patent [19]

Everett

[11] E Re. 31,286

[45] Reissued Jun. 21, 1983

[54] PRODUCTION OF ELECTROLYTIC BATTERY ACTIVE MANGANESE DIOXIDE

[76] Inventor: Peter K. Everett, Castlecrag, New South Wales 2068, Australia

[21] Appl. No.: 152,505

[22] Filed: May 22, 1980

Related U.S. Patent Documents

Reissue of:

[64] Patent No.: 3,951,765
Issued: Apr. 20, 1976
Appl. No.: 531,800
Filed: Dec. 11, 1974

[30] Foreign Application Priority Data

Dec. 20, 1973 [AU] Australia ..... 6071/73

[51] Int. Cl.[3] ..... C25B 1/00

[52] U.S. Cl. ..... 204/96

[58] Field of Search ..... 204/96

[56] References Cited

U.S. PATENT DOCUMENTS 272,391 2/1883 Thiollier ..... 204/96

*Primary Examiner*—R. L. Andrews
*Attorney, Agent, or Firm*—Robert E. Burns; Emmanuel J. Lobato; Bruce L. Adams

[57] ABSTRACT

This process concerns the direct electroconversion of low grade manganese ores to high purity manganese dioxide product, which, among other applications, is ideally suited for use in dry cells. The process operating conditions are controlled such that impurities in the ore are substantially eliminated from the product. A decrease in impurity levels in excess of 100 fold can be achieved between the product and the ore feed.

10 Claims, 3 Drawing Figures

TYPICAL NOVEL ELECTROLYTIC CELL CONFIGURATION

TYPICAL NOVEL ELECTROLYTIC CELL CONFIGURATION

BATCH OR SEMI-BATCH OPERATION

CONTINUOUS PROCESS

PRODUCTION OF ELECTROLYTIC BATTERY ACTIVE MANGANESE DIOXIDE

Figure 1:
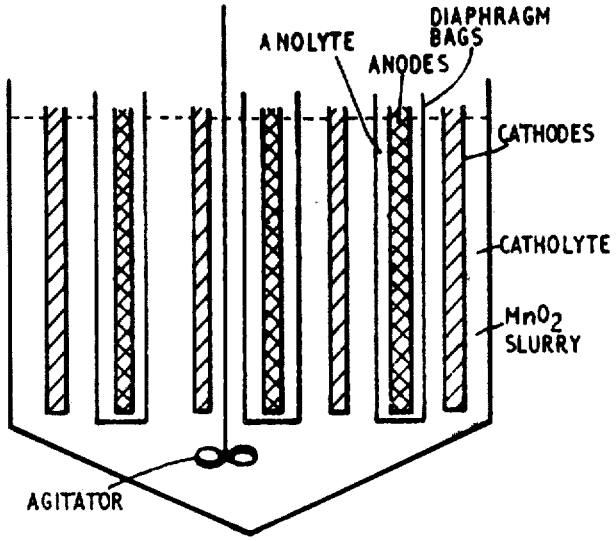

Matter enclosed in heavy brackets [ ] appears in the original patent but forms no part of this reissue specification; matter printed in italics indicates the additions made by reissue.

PRODUCT APPLICATIONS

The major application of the manganese dioxide product is in its use as the cathode depolariser in the conventional Leclanche dry cell battery. This high grade $\gamma$—$MnO_2$ is ideally suited for dry cell applications because of its high electrochemical activity. Finely divided synthetic manganese dioxide is also used in ferrite manufacture and for pigments. Other applications are in ceramics, welding rods and the general chemical industry.

THE CONVENTIONAL PROCESS

The conventional process for the production of $\gamma$—$MnO_2$ from a manganese dioxide feed ore consists of the following steps:

1. High temperature reduction roasting of the natural $MnO_2$ to MnO.
2. Acid dissolution of this MnO in the spent electrolyte.
3. Purification of the pregnant leach liquors (a) with a base, to remove iron, and (b) with a sulphide, to remove heavy metal impurities.
4. Electrolysis of the filtered electrolyte to produce a high purity $MnO_2$ product at the anode according to equation (2) and hydrogen at the cathode.

$$2H^+ + 2e^- \rightarrow H_2$$

Notable disadvantages of the conventional process are: (a) the need for pretreatment (reduction roasting) of the feed ore which is an energy consuming step with polluting side effects; (b) the evolution of hydrogen from the hot (80°-100° C.) electrolytic cells causes appreciable heat losses due to the greatly increased evaporation of water and can also produce an acid mist which yields an unpleasant working environment and building corrosion; (c) depletion of the solution $Mn^{2+}$ content.

THE NOVEL PROCESS

In essence, the process herein described concerns the electrorefining of manganese dioxide to produce a high grade synthetic product from natural ore. The principal equations describing the cathode and anode reactions are:

$$\text{Cathode } MnO_2 + 4H^+ + 2e^- \rightarrow Mn^{2+} + 2H_2O \quad (1)$$

$$\text{Anode } Mn^{2+} + 2H_2O \rightarrow MnO_2 + 4H^+ + 2e^- \quad (2)$$

As these equations balance each other in consumption and formation of species, only make-up quantities of other materials are required. This novel process has simultaneously overcome all the disadvantages of the conventional process and has markedly reduced the extent of purification required due to the selectivity of the leach. A further advantage of this novel process is a reduction in the cell operating voltage through the high anolyte $Mn^{2+}$ concentrations and the lower cathode potential of the dissolution reaction compared with that for $H_2$ evolution, this giving a notable reduction in power consumption.

As this process is based upon two reversible equations, the nature of the anodic species is only significant to the extent at which alternate reactions may occur at the electrodes. Thus, it must be noted that while sulphate, chloride and nitrate solutions may be used, sulphate solutions are preferred at these present least operating difficulties.

This invention may be conducted in a cell containing three essential elements 1. a cathode compartment which contains a slurry of particulate $MnO_2$, the Mn content of which is being selectively leached by a reducing environment attributable to the cathode;
2. an anode compartment comprising a manganese containing electrolyte (either the sulphate, chloride or nitrate) from which an $MnO_2$ product is being produced;
3. an ion-permeable diaphragm, which is impermeable to the particulate $MnO_2$ slurry, separating the anode and cathode regions.

A typical such cell is illustrated in FIG. 1, this figure being provided to facilitate understanding of the process and is not to be considered in any way limiting this invention.

The conditions in the anolyte compartment may be controlled to produce a variety of $MnO_2$ products. For example, at 90°-98° C., a dense anode deposit of $\gamma$-$MnO_2$ may be deposited, whilst at 15°-25° C., a particulate product may be formed. Typical materials suitable for use at the anode include carbon, lead and titanium, all of which are currently used within the industry. The temperature conditions in the catholyte are by necessity similar to those selected for the anodic product formation step. However, markedly different solution conditions may be attained by control of the diaphragm material and electrolysis conditions. Correct selection of the diaphragm material is essential for the control of anolyte/catholyte acidities as the anode reaction is acid producing and $Mn^{2+}$ ion consuming, whilst the cathode reaction is acid consuming and $Mn^{2+}$ ion producing.

The conditions under which this invention operates are:

i. Anode Compartment A temperature from about 15° C. to the solution boiling point (about 120° C.), with a preferred temperature range of 80°-100° C. for the production of an adherent anode deposit of $\gamma$-$MnO_2$, and of 15°-25° C. for a particulate product; a solution manganese content of about 20 g/l Mn to about 200 g/l Mn, with a preferred value of 80 to 130 g/l, as this ensures a high deposit efficiency>95%; an operating solution acidity of up to about 5N, with a preferred acidity of about 2N; and an anode current density of about 30 to about 250 Amp/m$^2$ for an adherent high temperature deposit and of about 1000 to 4000 Amp/m$^2$ for a particulate deposit. Whilst from a capital investment standpoint, high current densities are desirable, product properties, current efficiencies and cell operating conditions are superior at intermediate current densities, thus the preferred current density range is 30 to 120 A/m$^2$ for titanium anodes and 80 to 140 A/m$^2$ for carbon anodes to obtain a conventional adherent deposit. As those skilled in the art are well aware, the high preferred manganese concentrations facilitate operation at high current densities.

ii. Cathode Compartment The cathode solution conditions are related to those in the anolyte by the relative rates of electrolytic generation or consumption and diffusion through the diaphragm. The nominated solution temperatures are as given for the anode, namely 15° C. to the solution boiling point; nominated dissolved manganese contents are from 30 g/l to about 220 g/l Mn; nominated solution acidities are from about pH7 to pH0 with a value of about pH4 to pH0.5 preferred. In fact low catholyte acidities are particularly important in avoiding the dissolution of nonmanganese elements.

A solids loading of about 20 to 350 g/l may be used whilst the preferred range is about 50 to 200 g/l. The ore feed should preferably be finely ground, say >95% less than 50 μm, to attain high dissolution efficiency, but the process is operable with larger particle sizes. Together with catholyte acidity, selection of the cathode material and current density are particularly important to control the selective leaching of $MnO_2$ and to prevent the dissolution of impurities. Typical cathode current densities of 5 to 400 Amp/m$^2$ may be used with preferred current densities of 25 to 100 Amp/m$^2$.

EXAMPLE

The following example is provided to illustrate this invention but should not be construed as limiting this invention in any way whatsoever.

1200 g of $MnO_2$ ore was agitated in 81 of $MnSO_4$ solution (105 g/l $Mn^{2+}$ and 2.9 g/l $H_2SO_4$) in a diaphragm cell containing three titanium anodes, each 12 cm×10 cm submerged area and enclosed in polypropylene cloth diaphragm bags, and four graphite cathodes, each 12 cm×10 cm submerged area, external to the diaphragm bags.

Current was passed at 60$^A$/m$^2$ of anode area for 96 hours at a temperature of 90° C. The average cell voltage was 2.1 Volt. The power consumption was 1.24 KWH/Kg.

The adherent $MnO_2$ product was stripped from the titanium anodes and the catholyte slurry filtered to recover the residue.

In Table 1 below, it can be seen that product of high purity is formed and a large reduction in impurity level, one hundred fold in the case of Fe, can be obtained between feed ore and product.

TABLE 1

ANALYTICAL RESULTS

| Component | Ore | Product | Residue | Electrolyte Start | | Electrolyte Finish |
|---|---|---|---|---|---|---|
| $H_2SO_4$ | — | — | — | 2.9 g/l | Anolyte 98.0 g/l | Catholyte 9.8 g/l |
| Mn | 45% | 62% | 20% | 9.5% | | 9.3% |
| Fe | 20,000 ppm | 200 ppm | 35,000 ppm | 190 mg/l | | 320 mg/l |
| Cu | 150 | 20 | 250 | 8 | | 6 |
| Pb | 100 | 50 | 200 | 14 | | 14 |
| Zn | 70 | 20 | 100 | 78 | | 70 |
| Ni | 100 | 20 | 200 | 130 | | 110 |
| Co | 70 | 30 | 100 | 114 | | 100 |
| Cr | 60 | 10 | 100 | 2 | | 4 |
| Mo | 440 | — | 1,000 | — | | — |
| Ca | 16,000 | 200 | 30,000 | 100 | | 400 |
| Mg | 10,000 | — | 25,000 | 240 | | 600 |
| K | 5,500 | 200 | 12,000 | 40 | | 120 |
| Na | 1,040 | 20 | 2,300 | 40 | | 200 |
| Number of grams | 1,200 | 675 | 560 | — | | — |

In Table 2, it can be seen that product of high electrochemical activity can be prepared. The product prepared has been compared with a standard electrolytic manganese dioxide from Japan. The method used to determine the electrochemical activity was by the Kornfeil test. Manganese dioxide sample (0.50 g) and acetylene black (0.20 g) are mixed as a slurry with electrolyte solution (Kornfeil 2 solution) to a standard moisture level. This mix is then added into the Kornfeil cell and the wet black mix compressed with the carbon cathode rod by loading with a 2 kg weight. The resulting Kornfeil pellet was maintained under this load and discharged between the carbon and zinc electrodes at constant current drains. The residual cell voltage was determined as a function of time by a pulseinterrupt technique, to a final voltage of 1.00 volts. The time of discharge is taken as a measure of the electrochemical activity of the manganese dioxide.

TABLE 2

ELECTROCHEMICAL ACTIVITY OF PRODUCT-continued

| Product | Time to 1.0V at high current drain of 60mA | Time to 1.0V at low current drain of 12mA |
|---|---|---|
| Standard Electrolytic $MnO_2$ (Japan) | 4,000 sec. | 25,200 sec. |
| Example product | 4,300 | 27,000 |

Whilst this invention concerns a process for the electrorefining of $MnO_2$, it must be noted that a variety of process flow sheets are possible, the following illustrations of which are provided but in no way should be considered limiting.

The following discussion has been limited to the formation of a high temperature (80°-100° C.) adherent $\gamma$-$MnO_2$ product for illustrative purposes only.

Figure 2:
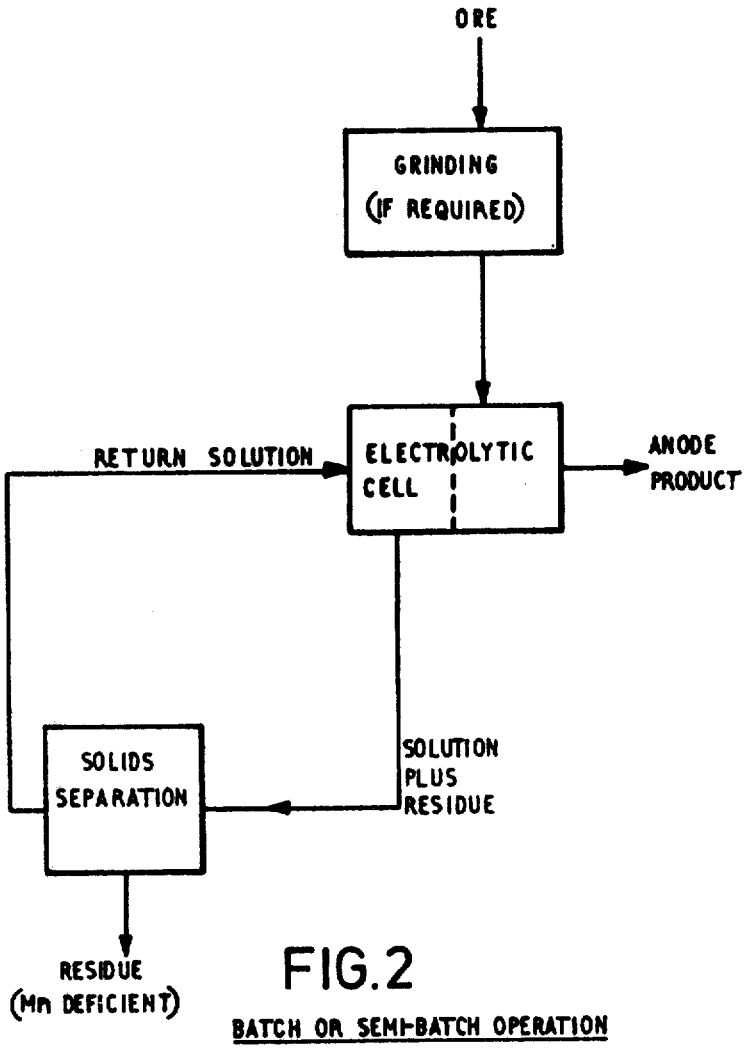

The simplest process flow sheet (FIG. 2) is the addition of ground ore to an electrolytic cell containing a prepared electrolyte, and the batchwise or semi-batchwise dissolution of ore occurs. When the electrolysis is ceased because of ore depletion of sludge accumulation, the manganese deficient residue is separated from the solution and the solution is returned to the cell and the process repeated. The anode may be removed periodically and the adherent deposit stripped at any time throughout the batch dissolution. Modifications of the above, including continuous ore addition to a non-flow cell or a continuous flow system via a multiple series of cells, are obvious to those skilled in the art.

Figure 3:
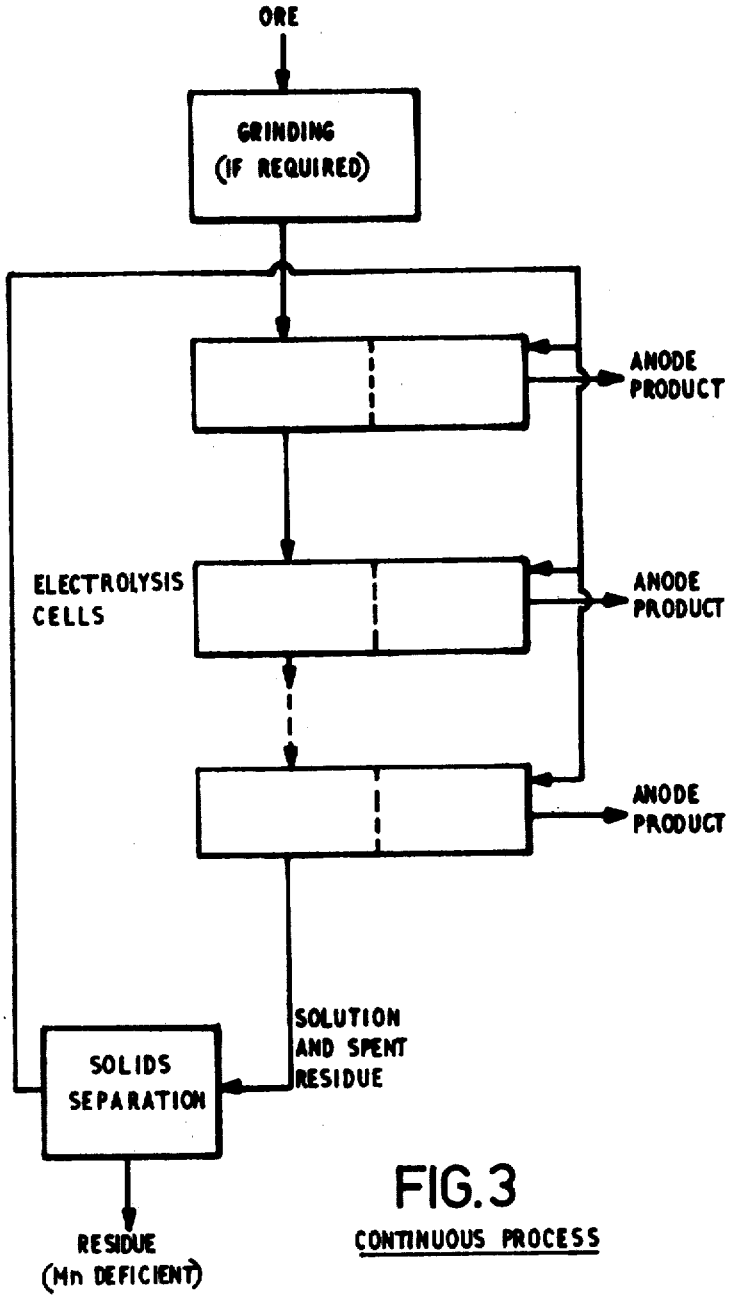

A refinement of the above single cell is the continuous removal of a portion of the catholyte, and the return of the solution, after filtration, to the cell, for example to the anolyte (FIG. 3). If desired, some form of purification treatment, e.g. pH adjustment, may be carried out before returning the electrolyte to the cell.

What I claim is:

1. A process for the production of high grade $\gamma MnO_2$ from manganese dioxide ore in an electrochemical cell having one or more inert anodes, immersed in an aqueous anolyte having a solution manganese content of 20 g/l Mn to 200 g/l Mn and an acidity of up to 5N, and one or more inert cathodes, immersed in a slurry consisting of particulate manganese dioxide ore and an aqueous catholyte having a solution manganese content of 30 g/l Mn to 220 g/l Mn and a pH below 7, the anodes and cathodes disposed on opposite sides of one or more porous diaphragms, the process consisting of applying a direct current potential between the anodes and cathodes to reduce the manganese dioxide slurry to ionic manganese which diffuses through the diaphragms and is oxidised at the anodes where $\gamma MnO_2$ is formed, the anode current density being 20 to 250

Amp/m$^2$ at a cell temperature of from [15 to 25° C.] *80° to 100° C.* or 1,000 to 4,000 Amp/m$^2$ at a cell temperature of [80° to 100° C.] *15° to 25° C.* and the cathode current density being 5 to 400 Amps/m$^2$.

2. A process as in claim 1 in which the electrolyte comprises the anion group, sulphate.

3. A process as claimed in claim 1 in which the electrolyte comprises the anion group, chloride.

4. A process as claimed in claim 1 in which the electrolyte comprises the anion group, nitrate.

5. A process as claimed in claim 1 in which the current density is from about 30 to 140 Amp/m$^2$.

6. A process as claimed in claim 1 in which the anolyte contains about 80 to 130 g/l Mn and about 2N acid.

7. A process as claimed in claim 1 in which the cathode current density is 25 to 100 Amp/m$^2$.

8. A process as claimed in claim 1 in which the ore content of the catholyte is about 20 to 350 g/l.

9. A process as claimed in claim 1 in which the ore content of the catholyte is about 50 to 200 g/l.

10. A process as claimed in claim 1, in which the acid content is such that the pH is in the range of about pH4 to pH0.5.

* * * * *